United States Patent [19]

Sinn et al.

[11] 4,404,344
[45] Sep. 13, 1983

[54] PREPARING ETHYLENE POLYMERS USING ZIEGLER CATALYST COMPRISING CYCLODIENYL COMPOUND OF ZIRCONIUM

[75] Inventors: Hansjörg W. Sinn, Hamburg; Walter O. Kaminsky, Pinneberg; Hans-Jürgen C. Vollmer, Hamburg; Rüdiger O. H. H. Woldt, Lüneberg, all of Fed. Rep. of Germany

[73] Assignee: BASF Aktiengesellschaft, Fed. Rep. of Germany

[21] Appl. No.: 238,955

[22] Filed: Feb. 27, 1981

[30] Foreign Application Priority Data

Feb. 29, 1980 [DE] Fed. Rep. of Germany ....... 3007725

[51] Int. Cl.³ ............................................... C08F 4/64
[52] U.S. Cl. .................................. 526/160; 252/431 R; 526/336; 526/348.2; 526/351; 526/352; 526/904
[58] Field of Search ........................................ 526/160

[56] References Cited

U.S. PATENT DOCUMENTS 2,924,593  2/1960  Breslow ............................ 526/160

FOREIGN PATENT DOCUMENTS 2608933  8/1977  Fed. Rep. of Germany ...... 526/160

Primary Examiner—Stanford M. Levin
Attorney, Agent, or Firm—Keil & Witherspoon

[57] ABSTRACT

The invention relates to a method for preparing polymers of ethylene and propylene, or of copolymers of ethylene and alpha olefins such as propylene 1-butene and 1-hexene or alpha omega dienes such as alpha omega octadiene, respectively, by polymerization within a temperature range from $-80°$ to $150°$ C. in the presence of a halogen free Ziegler type catalyst system consisting of a cyclopentadienyl compound containing a transition metal and of an aluminum alkyl compound, whereby the polymerization is made in the presence of catalyst system consisting of the following components:

(1) a compound containing a transition metal and having the general formula (cyclopentadienyl)-$_n$MeY$_n$, in which n is an integer from 1 to 4, Me is a transition metal, preferably zirconium, and Y being selected from the group of hydrogen, a $C_1$–$C_5$ alkyl group or $C_1$–$C_5$ metal alkyl group or of a compound of the following general formula

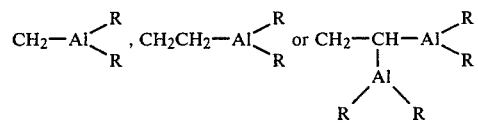

in which R is a $C_1$–$C_5$ alkyl group or $C_1$–$C_5$ metalloalkyl group, and (2) an aluminum containing compound of the alumoxan type having the general formula (R-Al-O)$_m$, in which m is an integer of 1 to 20 and R a $C_1$–$C_5$ alkyl group. Preferably the polymerization is effected in the presence of a catalyst system consisting of bis(cyclopentadienyl)zirconium methyl and an alumoxan of the above mentioned formula in which R is methyl group and m being above 2 and preferably above 5. Preferred copolymers of ethylene are obtained with 0.1 to 10% by weight of 1-butene, 1-hexene and alpha omega dienes such as the octadiene, as well as with propylene.

17 Claims, 1 Drawing Figure

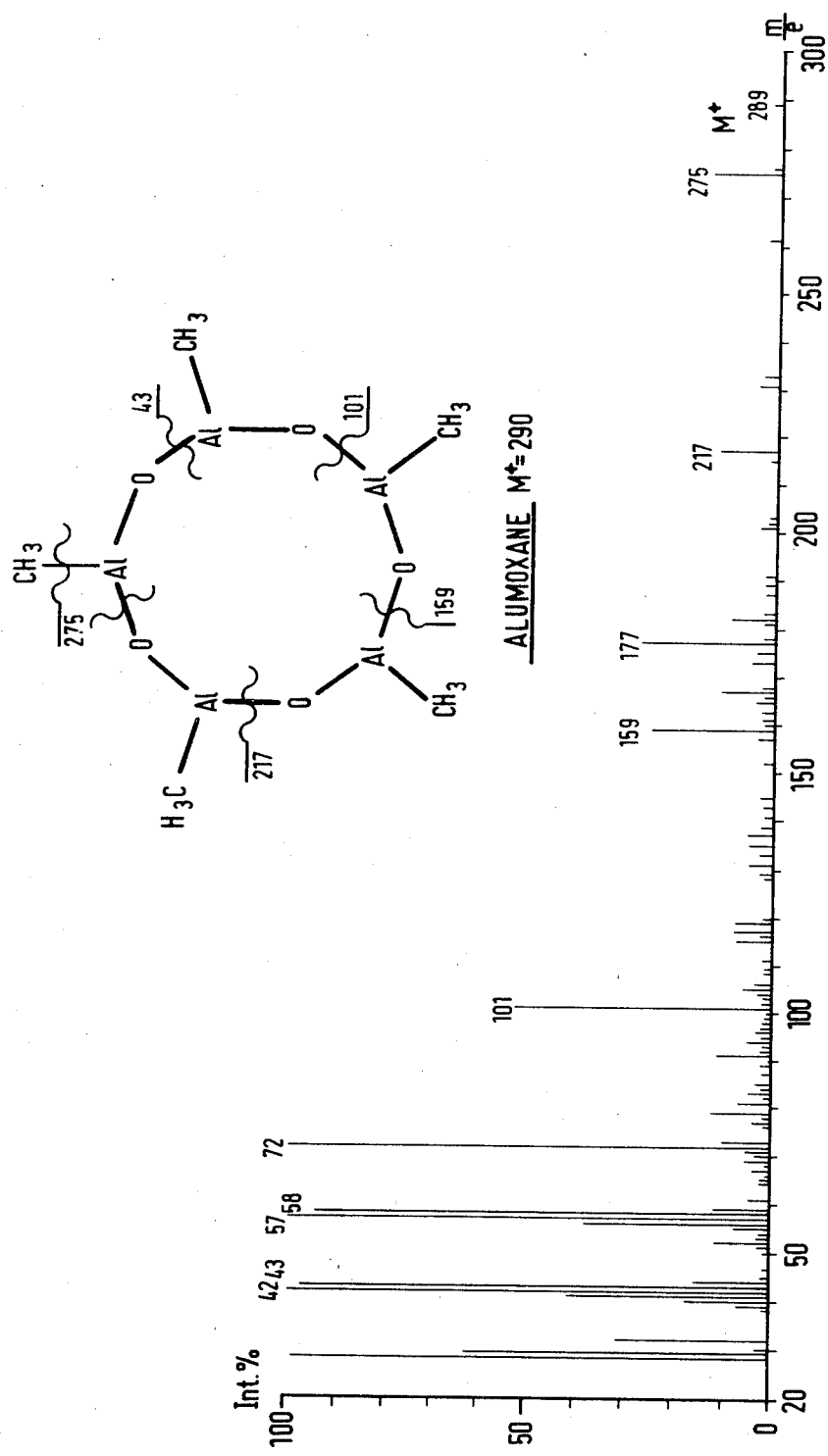

PREPARING ETHYLENE POLYMERS USING ZIEGLER CATALYST COMPRISING CYCLODIENYL COMPOUND OF ZIRCONIUM

This invention relates generally to a process for polymerization of ethylene and other alpha olefins by using a new Ziegler type catalyst complex. The invention relates especially to a process for making polymers of ethylene and proylene or of copolymers of ethylene and alpha olefins such as propylene, 1-hexene or alpha omega diene such as alpha omega octadiene by polymerization with a halogen free Ziegler type catalyst complex at a temperature range betwen $-80°$ to $150°$ C. whereby the Ziegler type catalyst complex consists of a cyclo pentadienyl compound containing zirconium and an aluminum alkyl compound.

Traditionally, ethylene and other alpha olefins are polymerized or copolymerized in the presence of catalytic complexes formed from mixtures consisting of transition metal compounds and aluminum alkyls. These insoluble Ziegler type catalyst complexes produced, i.e., by reaction between titanium tetrachloride, aluminum chloride, and aluminum triethyl have the disadvantage that they form an insoluble catalytic complex. Further, chlorine free Ziegler type catalyst complexes are known consisting of bis-(cyclopentadienyl)-titanium dialkyl or bis(cyclopendienyl)-zirconium dialkyl, respectively, and an aluminum trialkyl and water. By variation of temperature and water being added one may influence the molecular weight, however the value for productivity determined as the ratio by weight of total yield to transition metal being used are only in the range of above 100,000.

It is an object of the invention to propose a process for polymerization of ethylene and propylene or copolymerization of ethylene with other alpha olefins, respectively, with which a controlled molecular weight distribution and higher productivity are obtained.

It is further an object of the invention to provide a new catalyst system which is very effective at relatively low temperatures and with which the properties of the polymers can be influenced to obtain a more uniform size or a higher bulk density.

It has now been discovered that these objects are obtained when the polymerization is carried out in the presence of a catalyst system consisting of the following components:

(1) A compound containing zirconium having the general formula $(cyclopentadienyl)_n MeY_n$, in which n is an integer from 1 to 4, Me is zirconium and Y is selected from the group of hydrogen, $C_1$–$C_5$ alkyl group or $C_1$–$C_5$ metalloalkyl group or a group of the following general formula:

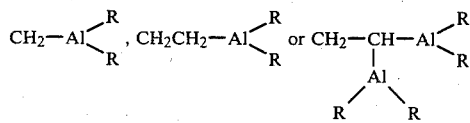

wherein R is a $C_1$–$C_5$-alkyl group or $C_1$–$C_5$ metalloalkyl group and (2) an aluminum containing compound of the alumoxan type having the general formula $(R-Al-O)_m$, wherein m is an integer from 1 to 20 and R is a $C_1$–$C_5$ alkyl group.

It is preferred to carry out the polymerization in the presence of a catalyst system consisting of bis(cyclopentadienyl) zirconium dimethyl and an alumoxan of the above general formula wherein R is a methyl group and m being greater than 2 and preferably greater than 5.

It is further preferred to provide in the catalyst system during the polymerization an atom ratio of Al:Zr in a range of about 10:1 to $10^8$:1. Preferbly the polymerization is carried out at an aluminum concentration being in a range from $10^{-6}$ to $10^{-2}$ mol/liter.

The polymerization is carried out at preferably a temperature range between 20° and 150° C.

In a further preferred modification of the polymerization of ethylene minor proportions of alpha olefins such as 1-hexene, 1-butene or alpha omega diens such as alpha omega octadiene are used as further monomers whereby surprisingly the density of the copolymers obtained is decreased and other advantageous properties of the copolymer are obtained.

It is surprising that in the new process for preparing polymers and copolymers with the new catalyst complexes or catalyst system there is obtained not only an increased yield of polymers but also further advantages relating to the physical properties of the polymer. The new catalyst systems are effective at relatively low temperatures. Further, the morphologic properties of the polymers and copolymers can be controlled to obtain a uniform particle size and/or a high bulk density. The catalysts can be easily prepared and handled because the preparation is made within an inert hydrocarbon medium. Further, with the new catalyst system it is possible to use less molecular weight modifiers during polymerization such as hydrogen which is important for the thermodynamic control of the polymerization process.

In the preferred embodiment of the method for preparing polymers or copolymers of ethylene, a catalyst system is used consisting of bis(cyclopentadienyl)zirconium dimethyl and methyl alumoxan, said alumoxan having a degree of oligomerization above 2 and preferably above 5. When working with such a catalyst system the addition of water as well as the usual activation with an organo aluminum compound is unnecessary. The productivity value for polyethylene being prepared with this catalyst system is above 100 million (g/g) while the value for the activity, being deterined as the productivity within a period of two hours, is in a range from 10 to 15 millions (g/g.2h).

For pure propylene values for the productivity are obtained within a range of 500,000 (g/g) and more.

The polymerization rate is practically constant, notwithstanding minor deviations during the first minutes. This means that the reaction mixture takes up the monomer at a constant rate for a period of several hours.

Relatively low molecular weight polymers are obtained at a higher polymerization temperature while relatively high molecular weight polymers are obtained at a lower polymerization temperature. If e.g. ethylene and propylene are present at the same time the respective copolymers are formed as well.

The best results as far as the productivity rate is concerned are obtained if the degree of oligomerization of the alumoxan (cryoscopically determined) are above 5 and especially above 10.

The polymerization can be effected within a broad temperature range and also below 0° C. and above 120° C. At a temperature of 60° C.$\pm 20°$ C. the molecular weight of the polymers or copolymers are within the optimum range.

The catalyst system according to the present invention is suitable for the polymerization both in solution and in gas phase.

If the polymerization is made in a solvent then the methyl alumoxan is preferably dissolved in a solvent whereby $10^{-3}$ to $10^{-4}$ molar solutions are used. Thereafter the temperature and pressure of the monomer are adjusted whereafter a solution of the zirconium compound is added in such an amount that the solution has a $10^{-5}$ to $10^{-10}$ molar concentration.

When carrying out polymerization in a gaseous phase a solution of methyl alumoxan with $10^{-3}$ molar concentration of aluminum and of the respective zirconium compound with $10^{-6}$ molar concentration of zirconium is prepared. This solution may be sprayed into the reactor for containing ethylene. In a preferred method the catalyst may then be added to vigorously stirred and pulverized polyethylene. When polymerizing in the gaseous phase it is of advantage that both alumoxan and $Cp_2Zr(CH_3)_2$ have practically no vapor pressure.

The alumoxanes can be prepared in many ways. They are obtained if extremely finely divided water, e.g. in the form of humid solvent, is added to solutions of aluminum trimethyl in benzene or other aliphatic hydrocarbons. Preferably, aluminum trimethyl is contacted with a copper sulphate being incompletely dehydrated. In a preferred method for preparing the alumoxan a slurry is made of finely divided copper sulfate pentahydrate and toluene. The slurry is transferred into a glass vessel whereafter, under a mantle of inert gas, aluminum trimethyl is added at a temperature of about $-20°$ C. in such an amount that about 4 aluminum atoms are available for 1 mol $CuSO_4.5H_2O$. The reaction mixture is maintained at room temperature for a period of about 24 to 48 hours whereby a slow hydrolysis occurs with the evolution of $CH_4$. It is preferred to cool the reaction mixture so that the temperature does not raise above 30° C. Thereafter the alumoxan is dissolved in toluene and is separated by filtration from the copper sulfate, whereafter the toluene is removed e.g. by distillation. It is assumed that during this method of preparation the low molecular alumoxan undergoes a condensation to higher oligomers of alumoxan by splitting off aluminum trimethyl.

BRIEF DESCRIPTION OF THE DRAWING

An alumoxan being prepared in such a way and being isolated by fractionally precipitation is characterized by mass spectrometic means as represented in FIG. 1.

The following illustrative examples bring out the more salient features of the invention.

EXAMPLE 1

A glass autoclave having a capacity of 1 liter was heated and flushed with argon. Thereafter 330 ml toluene were added and heated to a constant temperature of 70° C. 300 mg (5,1 mmol aluminum atoms) of methyl alumoxan were added. After short stirring during a period of about 3 minutes a solution of $(C_5H_5)_2Zr(CH_3)_2$ ($3,33.10^{-8}$ mol) in toluene are added. After a period of further 3 minutes ethylene is added until a pressure of 8 bar is reached. White polyethylene precipitated after about 120 seconds. After about 1 hour the contact was destroyed by the addition of methanol because the polyethylene being produced could not be stirred anymore. The polymer was filtered, washed several times with methanol and dried. The yield was 19.0 g, the average molecular weight was determined viscosimetrically with 165,000.

EXAMPLE 2

This example was carried out in accordance with Example 1, whereby the solution of $(C_5H_5)_2Zr(CH_3)_2$ in toluene was diluted so that the zirconium concentration in the reaction mixture was only $2,2.10^{-10}$ mol/liter. After a period of 26 hours 15,4 g polyethylene was formed which corresponds to a productivity of $$\frac{15,4 \text{ g Polyethylene}}{2,2 \cdot 10^{-8} \text{ g Zirconium.}} = 700 \cdot 10^6$$

EXAMPLE 3

The polymerization was carried out according to Example 1, whereby, however, propylene was used as monomer. After 24 hours the solvent and the excess of propylene were vented. 27 g of mostly atactic polypropylene was obtained corresponding to an activity of $$\frac{60.\text{g} \cdot 2 \text{ Polypropylene}}{10^{-5} \text{ g Zr} \cdot 26 \text{ hours}} = \text{about } 450.000$$

EXAMPLE 4

The polymerization was carried out according to Example 1, whereby 190 ml toluene was used as solvent and 5 ml 1-hexene was filed into the autoclave as additional monomer. The amount of catalyst for the alumoxan was 200 mg (3 mmol) and $2 \times 10^{-6}$ mol $ZrCp_2(CH_3)_2$. Ethylene was added under a pressure of 8 bar whereafter the polymerization took place at a temperature of 45° C. for a period of about 45 minutes. 14 g of a copolymerizate having a density of 0,94 g/ml was obtained.

EXAMPLE 5

This experiment was carried out according to Example 4, whereby instead of 1-hexene now 15 ml alpha omega octadiene were used and the concentration of zirconium was decreased by the Factor 10. 56,6 g cross-linked polyethylene was obtained after a polymerization period of 1 hour, said polyethylene having a density of 0,95 g/ml.

EXAMPLE 6

A 1 liter glass flask was heated and flushed with argon whereafter 5 g polyethylene having an average molecular weight of ($\overline{M}\eta = 131,000$) are added at a constant temperature of 60° C. whereafter 300 mg pulverized methyl alumoxan (5,1 mmol Al) are added under stirring. Thereafter the flask was evacuated to a pressure of 0.5 bar and filled with ethylene up to normal pressure. Thereafter a solutin of $CP_2Zr(CH_3)_2$ ($3,33.10^{-6}$ mol) in toluene are added. The toluene is stripped off by evacuation during a period of 5 minutes whereafter ethylene is added under pressure up to 8 bar. After a period of 2 hours 24,5 polyethylene are obtained having a average molecular weight of 132.000, as determined viscosimetrically.

EXAMPLE 7

According to Example 1, ethylene was polymerized in several runs under different conditions as listed in the following Table 1. The catalyst system being used consisted of bis-(cyclopentadienyl)zirconium dimethyl and methyl alumoxan having a molecular weight of 290 and a degree of oligomerization of 5, respectively. The polymerization took place in a 1 liter autoclave with 330 ml toluene as solvent and under an ethylene pressure of 8 bar.

TABLE I

| run | Cp$_2$Zr(CH$_3$)$_2$ mol/l | Methyl alumoxan mol Al-Unit/l | Time h | Temperature °C. |
|---|---|---|---|---|
| (a) | $10^{-7}$ | $6,76 \cdot 10^{-3}$ | 2 | 60 |
| (b) | $10^{-7}$ | $1,12 \cdot 10^{-2}$ | 2 | 60 |
| (c) | $10^{-7}$ | $1,17 \cdot 10^{-2}$ | 2 | 60 |
| (d) | $10^{-8}$ | $6,61 \cdot 10^{-3}$ | 2 | 70 |
| (e) | $10^{-8}$ | $1,58 \cdot 10^{-2}$ | 2 | 70 |
| (f) | $10^{-7}$ | $9,25 \cdot 10^{-3}$ | 2 | 70 |
| (g) | $10^{-7}$ | $1,48 \cdot 10^{-2}$ | 1 | 70 |
| (h) | $2,2 \cdot 10^{-10}$ | $1,45 \cdot 10^{-2}$ | 26 | 70 |
| (i) | $2,2 \cdot 10^{-10}$ | $1,45 \cdot 10^{-2}$ | 2 | 70 |
| (j) | $10^{-7}$ | $1,53 \cdot 10^{-2}$++ | 2 | 70 |
| (k) | $10^{-7}$ | $1,53 \cdot 10^{-2}$++ | 0,83 | 70 |

++An alumoxan of a higher degree of oligomerization was used.

The yields, the activities and the average molecular weight of the polyethylenes obtained under the above conditions are listed in Table II.

TABLE II

| run | Yield g | Activity $\frac{g\ PE}{G\ Zr.\ 2h}$ | $\overline{M}_\eta$ |
|---|---|---|---|
| (a) | 4.2 | $1.4 \cdot 10^6$ | 173,000 |
| (b) | 10.0 | $3.7 \cdot 10^6$ | 227,800 |
| (c) | 11.7 | $4.3 \cdot 10^6$ | 212,800 |
| (d) | 0.9 | $3.0 \cdot 10^6$ | 111,000 |
| (e) | 2.7 | $8.9 \cdot 10^6$ | 177,000 |
| (f) | 13.3 | $4.4 \cdot 10^6$ | 142,500 |
| (g) | 17.7 | $11.6 \cdot 10^6$+ | 142,600 |
| (h) | 15.4 | — | 216,000 |
| (i) | 0.56 | ca. $10 \cdot 10^6$ | 216,000 |
| (j) | 19.0 | $12.5 \cdot 10^6$+ | 166,000 |
| (k) | 18.8 | $14.9 \cdot 10^6$+ | 149,000 |

+extrapolated.

what is claimed is:

1. A process for preparing polymers of ethylene and propylene and of copolymers of ethylene and alpha olefins or alpha omega dienes, respectively by polymerizing the monomer(s) within a temperature range from −80° to 150° C. in the presence of a halogen free Ziegler type catalyst system consisting of a cyclopentadienyl compound containing zirconium and of an aluminum alkyl compound, characterized in that polymerization is made in the presence of catalyst system consisting of the following components:

(1) a compound containing zirconium and having the general formula (cyclopentadienyl)$_n$MeY$_n$, in which n is an integer from 1 to 4, Me is zirconium and Y is selected from the group consisting of hydrogen, a C$_1$-C$_5$ alkyl group or C$_1$-C$_5$ metal alkyl group or of a group of the following formula

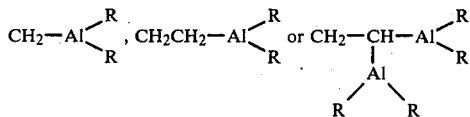

in which R is a C$_1$-C$_5$ alkyl group or a C$_1$-C$_5$ metalloalkyl group, and (2) an aluminum containing compound of the alumoxan type having the formula (R-Al-O)$_m$, in which m is an integer of 1 to 20 and R is a C$_1$-C$_5$ alkyl group.

2. The method of claim 1, characterized in that the polymerization is effected in the presence of a catalyst system consisting of bis(cyclopentadienyl)zirconium methyl and an alumoxan of the above mentioned formula in which R is a methyl group and m being above 2.

3. The method of claim 1, characterized in that the atom ratio of Al:Zr of the catalyst system is in the range of about 10:1 to 10$^8$:1 during polymerization.

4. The method of claim 1, characterized in that the polymerization is effected at an aluminum concentration of 10$^{-6}$ to 10$^{-2}$ mol/liter.

5. The method of claim 1, characterized in that polymerization is effected within a temperature range between 20° and 150° C.

6. A method for preparing copolymers of ethylene and alpha olefins, characterized in that the polymerization is effected within a temperature range from 20° to 150° C. and with a catalyst consisting of the following components:

(1) a compound containing zirconium and having the formula (cyclopentadienyl)$_n$MeY$_n$, in which n is an integer from 1 to 4, Me zirconium, and Y is selected from the group consisting of hydrogen, a C$_1$-C$_5$ alkyl group or C$_1$-C$_5$ metal alkyl group or of a group of the following formula

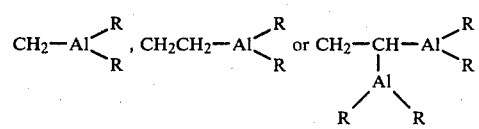

in which R is a C$_1$-C$_5$ alkyl group or C$_1$-C$_5$ metalloalkyl group, and (2) an aluminum containing compound of the alumoxan type having the formula (R-Al-O)$_m$, in which m is an integer of 1 to 20 and R is a C$_1$-C$_5$ alkyl group.

7. The method of claim 6, characterized in that the polymerization is effected in the presence of a catalyst system consisting of bis(cyclopentadienyl)zirconium methyl and an alumoxan of the above mentioned formula in which R is methyl group and m being above 2.

8. The method of claim 6, characterized in that the polymerization is effected with a major proportion of ethylene and a minor proportion of 0.1 to 10% by weight of a monomer selected from the group consisting of alpha-olefines-, and alpha omega dienes.

9. The method of claim 2, characterized in that the atom ratio of Al:Zr of the catalyst system is in the range of about 10:1 to 10$^8$:1 during polymerization.

10. The method of claim 2, characterized in that the polymerization is effected in an aluminum concentration of 10$^{-6}$ to 10$^{-2}$ mol/liter.

11. The method of claim 3, characterized in that the polymerization is effected at an aluminum concentration of 10$^{-6}$ to 10$^{-2}$ mol/liter.

12. The method of claim 2, characterized in that polymerization is effected within a temperature range between 20° and 150° C.

13. The method of claim 3, characterized in that polymerization is effected within a temperature range between 20° and 150° C.

14. The method of claim 4, characterized in that polymerization is effected within a temperature range between 20° and 150° C.

15. The method of claim 9, characterized in that polymerization is effected within a temperature range between 20° and 150° C.

16. The method of claim 10, characterized in that polymerization is effected within a temperature range between 20° and 150° C.

17. The method of claim 11, characterized in that polymerization is effected within a temperature range between 20° and 150° C.

* * * * *